United States Patent [19]
Ducharme et al.

[11] Patent Number: 5,930,515
[45] Date of Patent: Jul. 27, 1999

[54] APPARATUS AND METHOD FOR UPGRADING A COMPUTER SYSTEM OPERATING SYSTEM

[75] Inventors: Paul Ducharme, Scarborough; Karl W. Stoll, Pickering, both of Canada

[73] Assignee: Scientific-Atlanta, Inc., Norcross, Ga.

[21] Appl. No.: 08/941,044

[22] Filed: Sep. 30, 1997

[51] Int. Cl.$^6$ .................................................. G06F 9/445
[52] U.S. Cl. .................. 395/712; 395/500; 395/706; 711/151; 382/166
[58] Field of Search ............................... 395/500, 200.51, 395/712, 182.12, 706, 708; 364/184; 711/151; 382/166, 236

[56] References Cited

U.S. PATENT DOCUMENTS

| | | | |
|---|---|---|---|
| 4,567,560 | 1/1986 | Polis et al. | 364/184 |
| 5,034,915 | 7/1991 | Styrna etal. | 395/182.12 |
| 5,109,330 | 4/1992 | Pfeiffer At Al. | 711/151 |
| 5,155,847 | 10/1992 | Kirauac et al. | 395/200.51 |
| 5,210,854 | 5/1993 | Beaverton et al. | 395/500 |
| 5,212,742 | 5/1993 | Normille et al. | 382/166 |
| 5,267,334 | 11/1993 | Normille et al. | 382/236 |
| 5,359,730 | 10/1994 | Marron | 395/712 |
| 5,461,679 | 10/1995 | Normille et al. | 382/304 |
| 5,469,573 | 11/1995 | McGill, III et al. | 395/712 |
| 5,481,714 | 1/1996 | Pipkin et al. | 395/712 |
| 5,537,598 | 7/1996 | Kukula et al. | 395/712 |

OTHER PUBLICATIONS

Karatza, Helen, "Multitasking and resequencing in a two stage multiprocessing system", Proc. 1996 winter simulation conf. ACM, pp. 1247–1251, 1996.

Compton & Ravishankar, "Expected deadlock time in a multiprocessing system", J. of the ACM, vol. 42, No. 3, pp. 562–583, May 1995.

Hiraki et al., "Stage Skip pipeline: a low power processor architecture using a decoded instruction buffer", ISPLED–ACM, pp. 353–358, Aug. 1996.

*Primary Examiner*—Tariq R. Hafiz
*Assistant Examiner*—Anil Khatri
*Attorney, Agent, or Firm*—Kenneth M. Massaroni; Hubert J. Barnhardt, III; Kelly A. Gardner

[57] ABSTRACT

A method for upgrading a computer operating system of a computer system, for example, a communications receiver includes a main processor, a slave processor, a first memory, and a second memory, wherein an existing operating system resides in the first memory. The first memory is attached to the main processor and the second memory is attached to the slave processor. The method comprises the steps of receiving a new operating system in the second memory; erasing the existing operating system from the first memory; and loading the new operating system into the first memory. In a communications receiver such as a satellite business receiver for receiving and decoding video, audio and data bitstreams, the first memory may be FLASH memory and the second memory may be cache memory of a video processor, and, more particularly, a video random access memory.

13 Claims, 2 Drawing Sheets

APPARATUS AND METHOD FOR UPGRADING A COMPUTER SYSTEM OPERATING SYSTEM

BACKGROUND OF THE INVENTION

1. Technical Field

The present invention generally relates to computer systems and, more particularly, to an apparatus and method for upgrading a computer system operating system by loading the new operating system in a memory of or associated with a slave processor of the computer system. The present invention may find particular application in the upgrading of the operating systems of processor-based communication receivers, and, even more particularly, satellite receivers.

2. Description of Related Art

An operating system ("OS") is a computer software that runs a number of different applications programs in a computer system. An operating system operates to optimize the use of computer resources by allowing many different applications programs to run on the computer system. It is desirable, therefore, to upgrade a computer system operating system from time to time to ensure efficient use of the computer resources by maximizing the number of applications programs that can be run on the computer system. Typically, an operating system is stored in memory that comprises a portion of or is coupled to a main processor or slave processor of the computer system. In an integrated receiver/decoder used in satellite communications, the operating system comprises the application programs that supply the functionality of the receiver. Occasionally, it becomes necessary to provide corrections to normal functionality of the receiver or provide new features in the applications programs.

Currently, operating systems are upgraded as follows: (1) erasing the old (existing) operating system, including the old applications programs, from a memory attached to the main processor, for example, a non-volatile memory or, more particularly, a FLASH memory; (2) loading a new operating system into the non-volatile memory; and (3) assembling new applications programs from the new operating system in the non-volatile memory. By non-volatile memory is intended memory which is persistent when power is removed from the device which it serves. By FLASH memory as used herein, applicants mean a form of non-volatile memory that can be erased and written many times. FLASH memory thus behaves like so-called read-only memory when in normal use but can be erased and written by using device specific instructions that command the FLASH memory to erase itself and/or accept new data. A drawback of the current method, however, is the long window of time that is required to load the new operating system and to assemble the new applications programs in the non-volatile or, more particularly, FLASH memory. In a satellite communications system for transmitting video signals, for example, this window of time may be as long as 5 minutes during which the computer system is vulnerable to a system failure, such as a power failure, which will terminate the OS upgrade process. An adverse result of this is the computer system is left without an operating system because the old operating system has been erased and the new operating system has not been completely loaded.

One way of overcoming the above problem might be to buffer the new operating system in a memory of or attached to the main processor, for example, a random access memory ("RAM"), before erasing the old operating system from the non-volatile or FLASH memory. Once the entire new operating system is received in RAM, the FLASH memory containing the old operating system can be erased and loaded with the new operating system.

One form of temporary random access memory associated with a processor may be a cache memory, a special adjunct memory closely associated with the processor. Thus, a cache memory may comprise one form of buffer memory useful for assisting in an operating system upgrade. Buffering a large operating system requires a large RAM. A typical Business Satellite Receiver's ("BSR") operating system, for example, is approximately 270 kilobytes in size and can be expanded to 384 kilobytes. Moreover, a typical main processor of such a receiver may be limited in its memory addressing capabilities and may only have 128 kilobytes of random access memory (RAM). Current computer systems thus may have a limited amount of RAM attached to the main processor such that it is not always possible to employ this method. One alternative is to increase the costs of manufacturing a system by providing a more expensive main processor with greater random access memory. On the other hand, it is an objective of the present invention to provide an operating upgrade method which minimizes costs and, yet permits efficient operating system upgrade when required. Accordingly, there is a need for a more effective way of upgrading a computer system operating system without having to add more memory to the main processor and to save system receiver manufacturing costs.

SUMMARY OF THE INVENTION

The limitations cited above and others are substantially overcome through the apparatus and method described herein.

A method of the present invention for upgrading a computer system operating system is disclosed herein. The computer system, for example, a satellite communications receiver, includes a main processor, a slave processor to the main processor, a first memory, and a second memory, wherein an existing operating system resides in the first memory. The first memory is attached to the main processor and the second memory is attached to the slave processor. The method comprises the steps of receiving a new operating system in the second memory; erasing the existing operating system from the first memory; and loading the new operating system into the first memory. The first memory may be a FLASH memory and the second memory a cache memory of the slave processor. In this manner, cost of manufacturing the system are reduced and, as will be further described herein, operating system upgrades are handled efficiently.

An apparatus of the present invention for upgrading a computer system operating system is also disclosed herein. The computer system includes a main processor, a slave processor, a first memory, and a second memory, wherein an existing operating system resides in the first memory. The first memory is attached to the main processor and the second memory is attached to the slave processor. The apparatus comprises means for receiving a new operating system in the second memory; means for erasing the existing operating system from the first memory; and means for loading the new operating system into the first memory.

The above features and advantages of the present invention will be better understood from the following detailed description taken into conjunction with the accompanying drawings.

DETAILED DESCRIPTION

As stated above, a problem with the current computer systems is that there is not enough memory attached to the main processor to buffer the new operating system while keeping the existing operating system. The present invention overcomes the above problem by making use of memory attached to a slave processor of the computer system. A slave processor is a processor that has computing and processing capability whose main function is not computing or processing but assisting or controlling the main processor in computing or processing. Computer systems that have slave processors may be referred to herein as embedded systems. As used historically, an embedded system refers to a solid state device (having no moving parts) that contains a dedicated application program that is not directly modifiable, although the application program may be replaceable. In accordance with the present invention, an embedded operating system is upgradeable for the purposes of adding new features or functionality or permitting enhanced applications programming, as will be further described herein.

Figure 1:
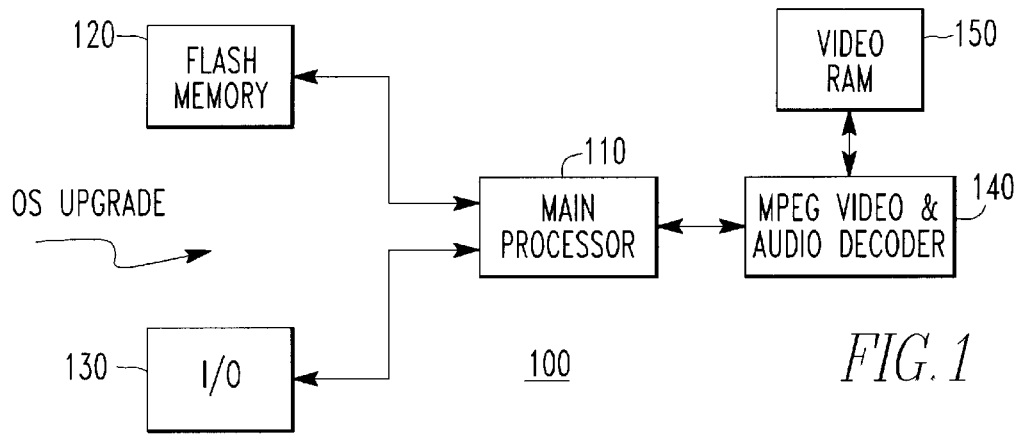
FIG. 1 illustrates a block diagram of an embedded system in accordance with the teachings of the present invention.

Referring to FIG. 1, there is shown a block diagram of an embedded system in accordance with the teachings of the present invention. One example of an embedded system as shown in FIG. 1 is an integrated receiver decoder of a satellite video system 100. Video system 100 includes a main processor 110, a read-write, non-volatile or FLASH memory 120, an input/output ("I/O") unit 130, an MPEG video decompression processor (video decoding chip) 140, and video RAM 150. An integrated receiver decoder receives encoded video/audio/data services from a transport stream and decode the services for presentation to the user. An example of an upgrade to such services might be to permit such bi-directional services as energy management and meter reading services via a reverse path to a service transmitter. Read-write, non-volatile or FLASH memory 120 is a non-volatile storage device for operating system/application programs than can run, for example, on an integrated receiver decoder to perform normal operations. An input/output unit 130 is a micro-controller that interfaces to front panel keys and displays of a computer system such as an IRD. The video decoding chip 140 is a slave processor which has a video RAM 150 attached to it for, for example, storing reconstructed pictures. In one embodiment of the present invention, the video chip 140 is an SGS Thompson 3520A microprocessor responsible for reconstructing video images and audio from MPEG encoded data. To accomplish this purpose, RAM 150 is attached to slave processor 140 as workspace. Finally, video RAM 150 is random access memory used by the video processing microprocessor 140. In an integrated receiver decoder, the so-called video RAM 150 is used by the audio/video decompression chip 140 for workspace while decompressing the audio and video service bitstreams and for storage of reconstructed images and audio prior to presentation.

The apparatus and method of the present invention take advantage of the large amount of buffer or, more particularly, cache memory that is attached to a slave processor, for example, the video RAM 150 in the above video system 100. Specifically, the video RAM 150 is a cache memory for slave processor 140 which is used to buffer a new operating system while the FLASH memory 120 still stores the existing operating system. Stated another way, rather than attempting to add a large amount of RAM required to buffer the large operating system to the main processor 110 and/or boosting the main processor's cost by designing for a main processor with additional memory addressing capability, the video RAM 150 of the video decoding chip 140 (slave processor) may used saving costs of manufacture and space on a main board.

In a video system such as a PowerVu™ Business Satellite Receiver (BSR) manufactured by Scientific-Atlanta, Inc., the video RAM 150 available to the video decoding portion of an MPEG2 Audio/Video Decompression Engine is used as a storage device (not as normal RAM) to buffer the new operating system until the entire new operating system has been received according to one particular embodiment of the present invention.

According to prior art techniques, it is believed that current computer systems may not make use of any form of buffering of a new operating system in upgrading operating systems. The current computer systems may erase the existing operating system at the start of every operating system upgrade before receiving a new operating system or upgrade to an existing operating system. As stated above, an adverse result of this is a lengthy duration when the computer system is vulnerable to a power interruption—the entire duration that the new operating system is being received.

However, on the PowerVu™ BSR and in satellite receivers generally, in accordance with the teachings of the present invention, the new operating system upgrade may be received in the MPEG2 Transport Stream in the form of a Code Download Table that comprises header data and a portion of the binary data of the upgrade. The header is used to control the receiver to perform the upgrade in accordance with the transmitted information and included commands. These tables may be validated, that is, verified for cyclic redundancy check (CRC), target receiver (for example, the correct model receiver for receiving the upgrade), reasonableness of data, etc., and then sent to be buffered in buffer or cache memory 150 of the slave processor 140.

The storage space used for buffering on the specific example of the BSR is the 2 Megabytes video RAM 150 used by the Thompson Sti3520A MPEG 2 Audio/Video Decompression Engine 140. Referring to FIG. 1, a functional block diagram useful in explaining the present invention, buffer memory, or cache memory of a slave processor 140 or the video RAM is shown as video RAM 150. In the normal operation of the BSR, this RAM 150 is used by the Sti3520A shown as slave processor 140 to decode the incoming video stream and to display a graphical user interface menu system. When an operating system upgrade is performed, however, no video decoding is being performed and only 512 kilobytes of the video RAM 150 is used to display a simplified menu system. Thus the code download tables, as described above, in the form, for example, of headers including commands and potions of the operating system upgrade code may be sent to the Sti3520A for storage in the remaining 1.5 Megabytes of video RAM 150. Similar techniques may be applied to other computer systems 100 or receivers that require update in a similar manner besides the BSR, and these may come to mind readily from the present explanation of one preferred embodiment and method of memory update.

Once all the code download tables that comprise all the commands and the new operating system have been received, the existing (old) operating system stored in FLASH memory 120 can be erased. The code tables may then be retrieved from the video RAM 150 via the Sti3520A 140, the binary data in the tables extracted and written to the main processor read-write, non-volatile memory or FLASH memory 120 to produce the new operating system.

An advantage of the above technique is that it minimizes the duration during which the video system has no valid operating system in FLASH 120. This duration is critical as a power interruption during loading of an operating system will result in the unit requiring the download of a new operating system before normal operations can continue.

In addition to the benefit of reducing the critical duration discussed above, the reception of the code download tables is more reliable as compared with previous systems. This occurs because no overhead of programming the FLASH 120 is incurred on the unit until all the required code download tables have been received. In the previous systems, this overhead causes the intermittent loss of code download tables as new tables cannot be processed while the unit is still programming previous tables into FLASH 120. As a result, this further extends the duration to receive all the code download tables and complete the operating system upgrade.

Figure 2:
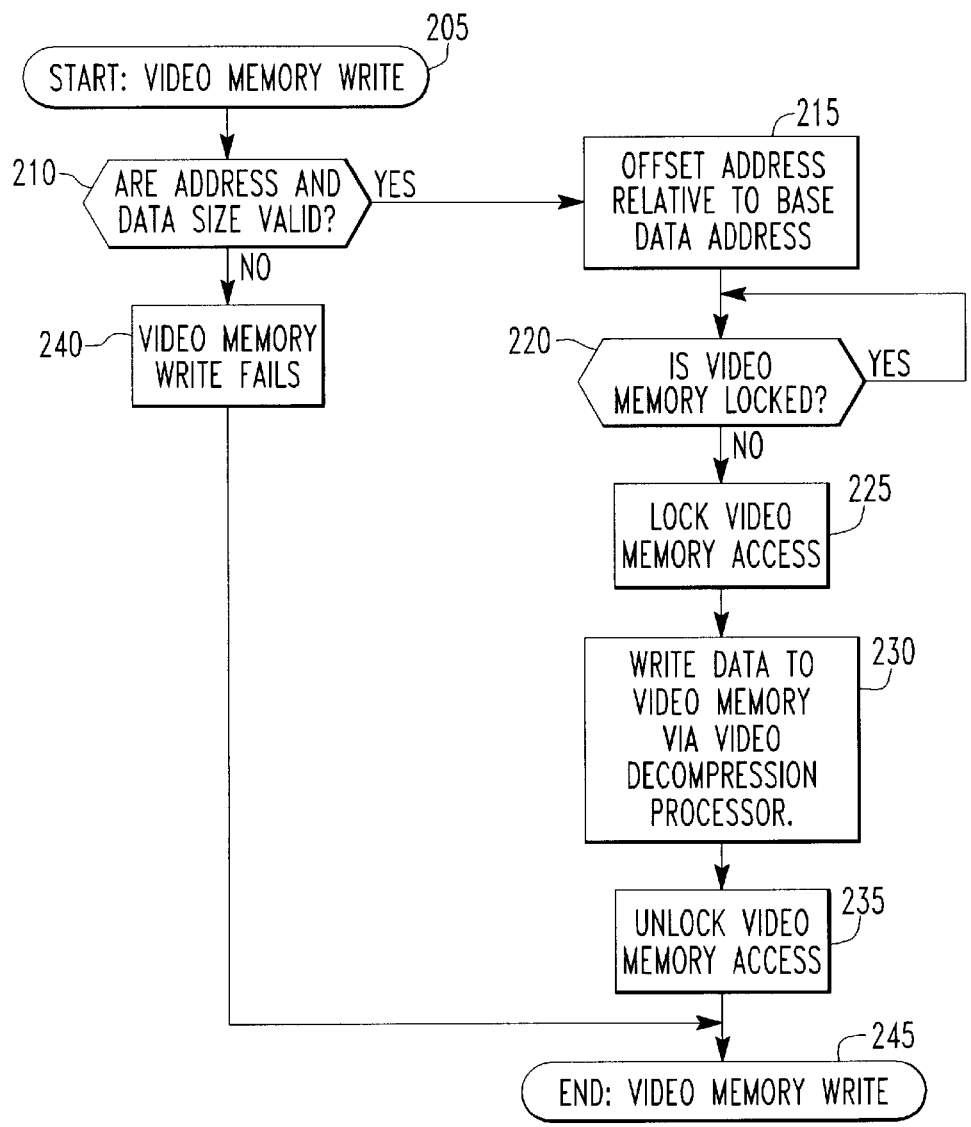
FIG. 2 illustrates a flow diagram of the Video Memory Write process in accordance with the teachings of the present invention.

Referring to FIG. 2, there is shown a flow diagram of the steps of writing a new operating system into the video RAM 150. This process is known as Video Memory Write and begins at step 205. At step 210, the address and data size of the new OS code download tables are checked to see if they are valid. If the address and data size of the new OS code download tables are valid, then proceed to step 215, else Video Memory Write has failed as shown in step 240 and the Video Memory Write process ends in step 245. Step 215 is particular to the operation of the SGS Thompson 3520A and its management of memory and may be eliminated in another form of slave processor. At 3520A specific step 215, then, with the 3520A, the address relative to the base data address is offset or incremented; otherwise, the step is not required.

The Video Memory 150 associated with the slave processor 140 is then checked to determine if it is locked in step 220. If the Video Memory 150 is locked, then repeat step 220, because this means that Video Memory 150 is being accessed by another process of slave processor 140. If the Video Memory 150 is not locked, then lock the video memory access in step 225 to ensure no other process modifies the video memory write pointer. Data is then written to Video Memory 150 via a slave or video decompression processor 140 in step 230. After data has been written to Video Memory 150 via the video decompression processor 140, the Video Memory Access is unlocked in step 235. This completes the Video Memory Write process as shown in step 245.

Figure 3:
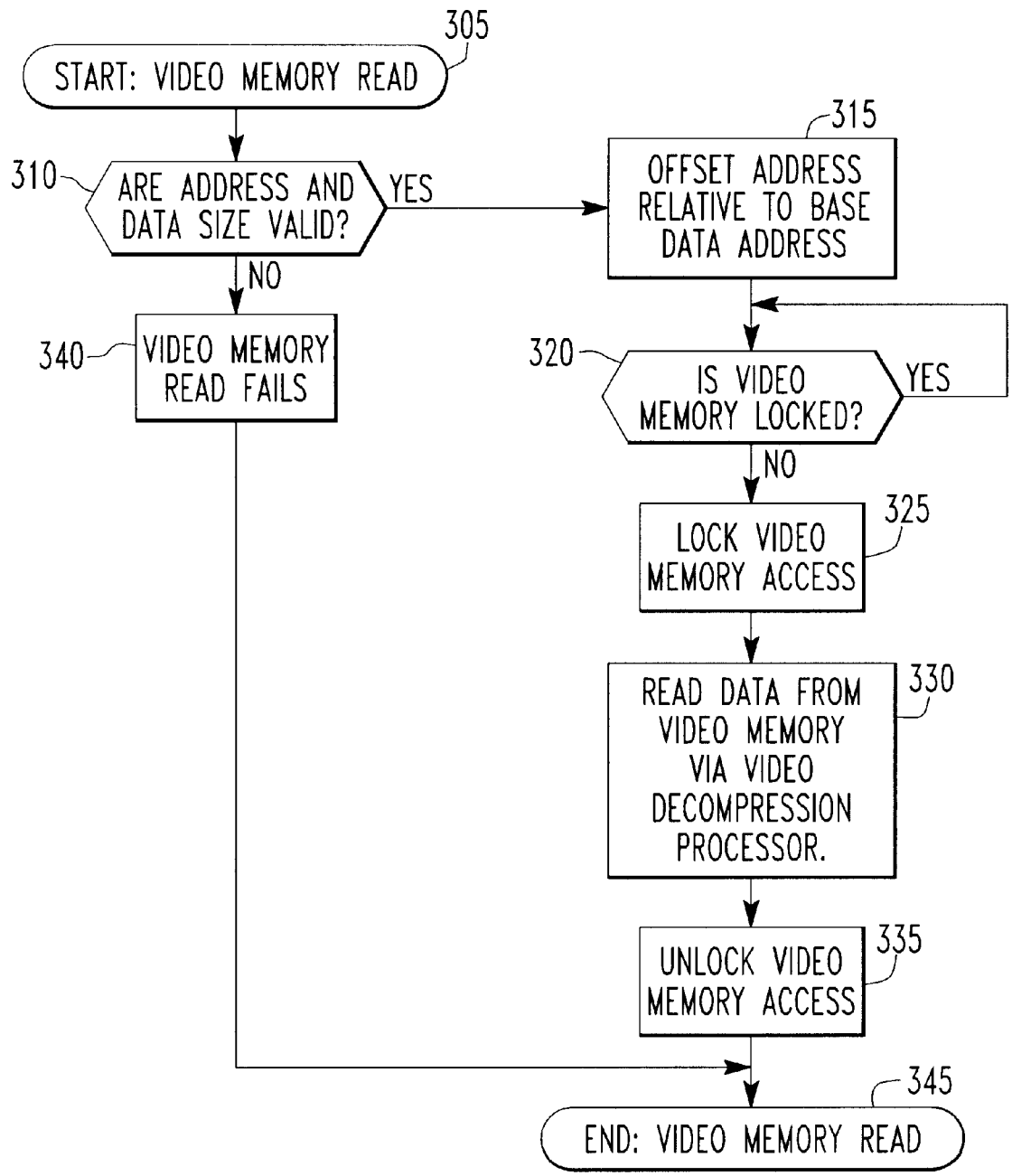
FIG. 3 illustrates a flow diagram of the Video Memory Read process in accordance with the teachings of the present invention.

Referring to FIG. 3, there is shown a flow diagram of the steps of reading the new operating system from the video RAM 150 and moving to FLASH memory 120, including retrieval of the code download tables. This process is known as Video Memory Read and begins at step 305. At step 310, the address and data size of the new OS code download tables are checked to see if they are valid. As before with step 215, step 315 is specific to the operation of the SGS Thompson 3520A and may be eliminated in other slave processor applications. If the address and data size of the new OS code download tables are valid, then proceed to step 315, else Video Memory Read has failed as shown in step 340 and the Video Memory Read process ends in step 345.

At step 315, the address relative to the base data address is offset or incremented if the slave processor is an SGS Thompson 3520A. As before, the cache or Video Memory 150 is then checked to determine if it is locked in step 320. If the Video Memory 150 is locked, then repeat step 320 because this means that Video Memory is being accessed by another process. If the Video Memory 150 is not locked, then lock the video memory access in step 325 to ensure no other process modifies the video memory read pointer. Data is then read from Video Memory 150 via the slave or video decompression processor 140 in step 330. After data has been read from Video Memory 150 via the video decompression processor, the Video Memory Access is unlocked in step 335. The binary data of the new upgrade is extracted from the code download tables during step 330 and in accordance with the commands of the header data is written into FLASH memory 120. Once all the binary data has been written to the FLASH memory 120, the new operating system and application programs are complete and ready for use. This completes the Video Memory Read process as shown in step 345.

While the invention has been described in detail with reference to a preferred embodiment and selected variations thereof, it should be apparent to those skilled in the art that many modifications and variations are possible without departure from the scope and spirit of this invention as defined in the appended claims.

We claim:

1. A method for upgrading an operating system in a computer system of a satellite video receiver, the computer system including a main processor, a video decoding chip, a first memory, and a second memory, wherein an existing operating system resides in the first memory, comprising the steps of:

receiving a new operating system in the second memory;

erasing the existing operating system from the first memory; and loading the new operating system into the first memory.

2. The method of claim 1, wherein the first memory is attached to the main processor.

3. The method of claim 1, wherein the second memory is attached to the video decoding chip.

4. The method of claim 1, wherein the first memory is FLASH memory.

5. The method of claim 1, wherein the second memory is cache memory.

6. The method of claim 1, further comprising the step of assembling applications programs from the new operating system in the first memory.

7. An apparatus for upgrading an operating system in a computer system of a satellite video receiver, the computer system including a main processor, a video decoding chip, a first memory, and a second memory, wherein an existing operating system resides in the first memory, comprising:

means for receiving a new operating system in the second memory;

means for erasing the existing operating system from the first memory; and means for loading the new operating system into the first memory.

8. The apparatus of claim 7, wherein the first memory is attached to the main processor.

9. The apparatus of claim 7, wherein the second memory is attached to the video decoding chip.

10. The apparatus of claim 7, wherein the first memory is FLASH memory.

11. The apparatus of claim 7, wherein the second memory is cache memory.

12. The apparatus of claim 9, further comprising means for assembling applications programs from the new operating system in the first memory.

13. The apparatus of claim 12 further comprising an input/output interface for user interaction with said new operating system.

* * * * *